United States Patent
Offenberg et al.

(10) Patent No.: US 9,443,111 B2
(45) Date of Patent: Sep. 13, 2016

(54) DEVICE SECURITY USING AN ENCRYPTED KEYSTORE DATA STRUCTURE

(71) Applicant: Seagate Technology LLC, Cupertino, CA (US)

(72) Inventors: Manuel A. Offenberg, San Francisco, CA (US); Monty A. Forehand, Loveland, CO (US); Christopher J. DeMattio, Longmont, CO (US); KianBeng Lim, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 174 days.

(21) Appl. No.: 14/194,290

(22) Filed: Feb. 28, 2014

(65) Prior Publication Data

US 2015/0248568 A1     Sep. 3, 2015

(51) Int. Cl.
*G06F 21/78* (2013.01)
*G06F 21/62* (2013.01)

(52) U.S. Cl.
CPC .......... *G06F 21/78* (2013.01); *G06F 21/6218* (2013.01); *G06F 2221/0748* (2013.01)

(58) Field of Classification Search
CPC .............. G06F 21/78; G06F 21/6218; G06F 2221/0748
See application file for complete search history.

(56) References Cited

U.S. PATENT DOCUMENTS

| | | |
|---|---|---|
| 7,814,337 B2 | 10/2010 | Lee et al. |
| 8,200,989 B2 | 6/2012 | Kim |
| 8,391,495 B2 | 3/2013 | McLane et al. |
| 8,526,605 B2 | 9/2013 | Matthews, Jr. |
| 2011/0314304 A1 | 12/2011 | Braams |
| 2012/0278635 A1 | 11/2012 | Hars et al. |
| 2012/0290809 A1 | 11/2012 | Little et al. |
| 2013/0132722 A1* | 5/2013 | Bennett ................. H04L 9/0816 713/171 |
| 2013/0177157 A1 | 7/2013 | Li et al. |
| 2013/0219189 A1 | 8/2013 | Simmons |
| 2014/0157002 A1* | 6/2014 | Grobman .............. H04L 9/0631 713/189 |

\* cited by examiner

*Primary Examiner* — Matthew Smithers
(74) *Attorney, Agent, or Firm* — Hall Estill Attorneys at Law

(57) ABSTRACT

Apparatus and method for data security through the use of an encrypted keystore data structure. In accordance with some embodiments, first and second sets of input data are respectively encrypted using first and second encryption keys to form corresponding first and second encrypted data sets. The first and second encryption keys are combined to form a string. A hidden key stored within a system on chip (SOC) is used to encrypt the string to form an encrypted keystore data structure, and the first and second encrypted data sets and the encrypted keystore data structure are stored in a memory.

20 Claims, 5 Drawing Sheets

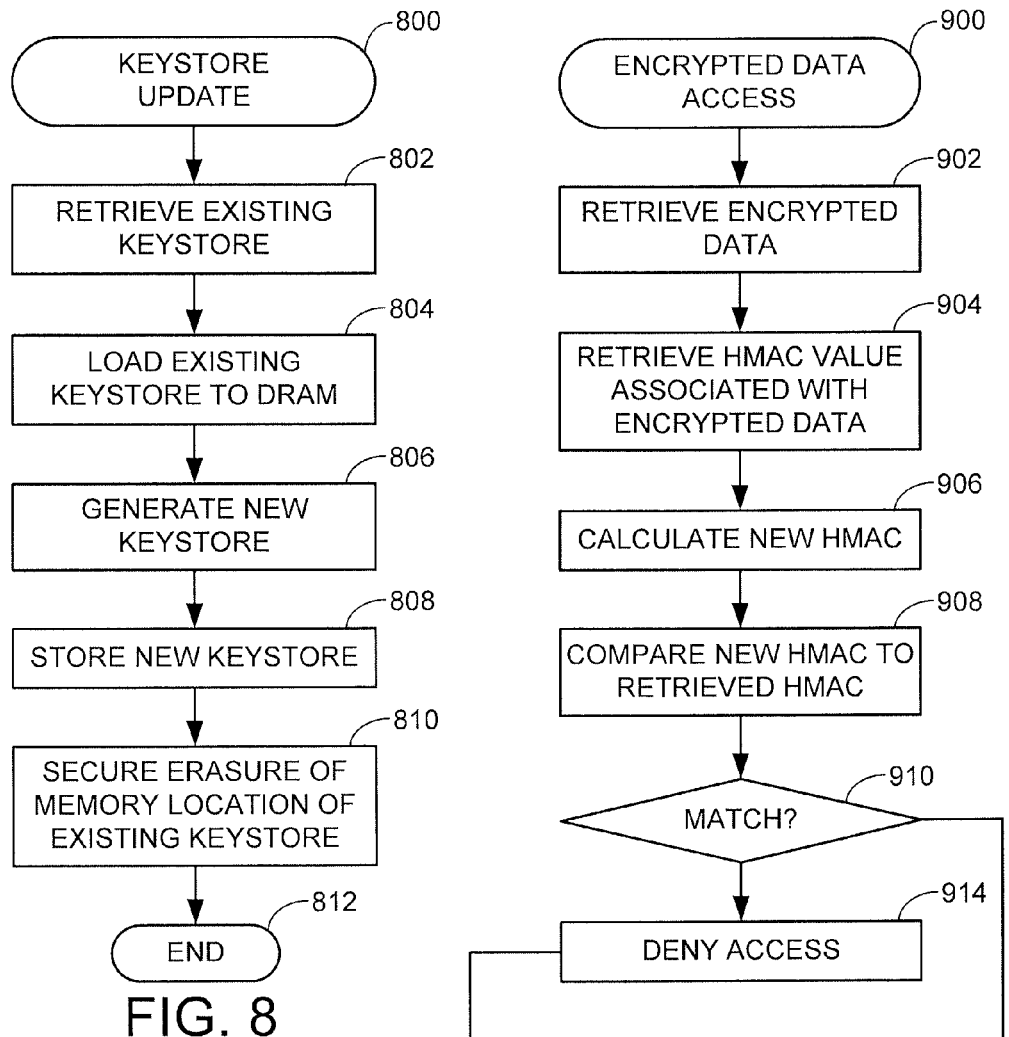
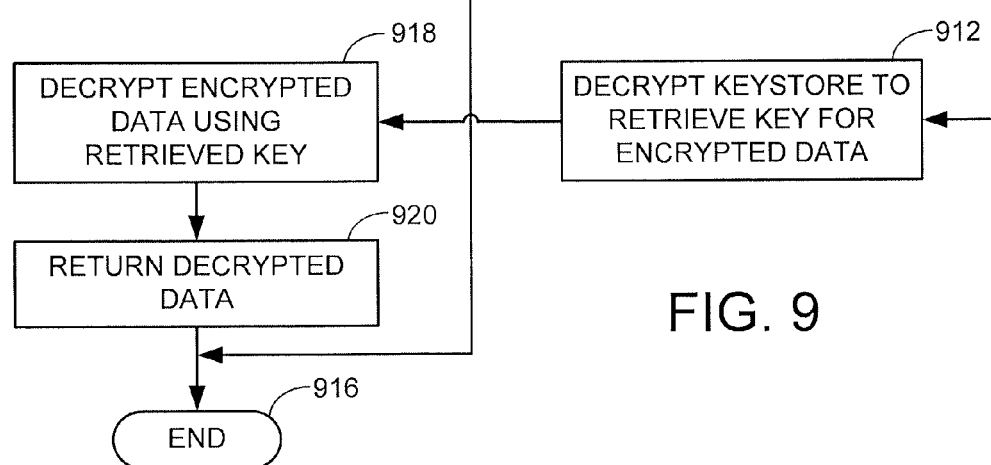
FIG. 8
FIG. 9

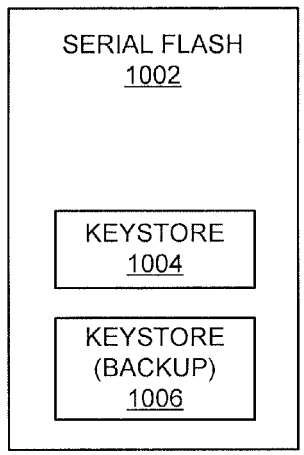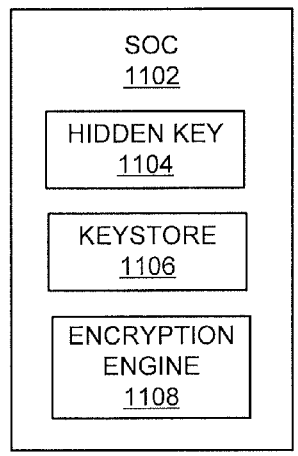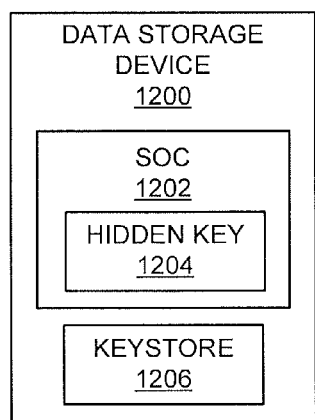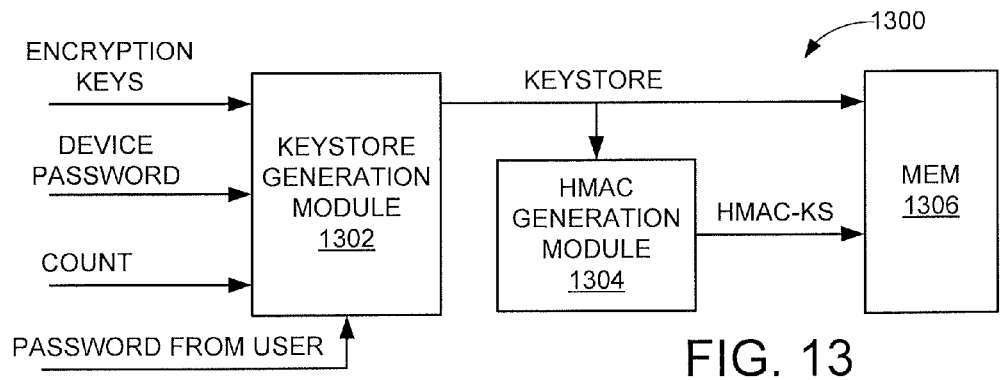

DEVICE SECURITY USING AN ENCRYPTED KEYSTORE DATA STRUCTURE

SUMMARY

Various embodiments of the present disclosure are generally directed to data security in a data storage device.

In some embodiments, first and second sets of input data are respectively encrypted using first and second encryption keys to form corresponding first and second encrypted data sets. The first and second encryption keys are combined to form a string. A hidden key stored within a system on chip (SOC) is used to encrypt the string to form an encrypted keystore data structure, and the first and second encrypted data sets and the encrypted keystore data structure are stored in a memory.

In other embodiments, an encryption engine uses first and second encryption keys to respectively encrypt first and second sets of input data to provide corresponding first and second encrypted data sets. A system on chip (SOC) integrated circuit device has an internal non-volatile memory which stores a hidden encryption key. A keystore generation module combines the first and second encryption keys to form a string, encrypts the string using the hidden encryption key to form an encrypted keystore data structure, and jettisons the first and second encryption keys responsive to formation of the encrypted keystore data structure.

These and other features which characterize various embodiments of the present disclosure can be understood in view of the following detailed discussion and the accompanying drawings.

BRIEF DESCRIPTION OF THE DRAWINGS

FIG. 8 is a keystore update routine carried out in accordance with some embodiments.

FIG. 9 is a protected data access routine carried out in accordance with some embodiments.

FIG. 10 is a functional block representation of serial flash in accordance with some embodiments.

FIG. 11 is a functional block representation of an ASIC in accordance with some embodiments.

FIG. 12 shows a storage device in conjunction with a secure server in accordance with some embodiments.

FIG. 13 is a functional block representation of aspects of another data storage device in accordance with some embodiments.

DETAILED DESCRIPTION

Figure 1:
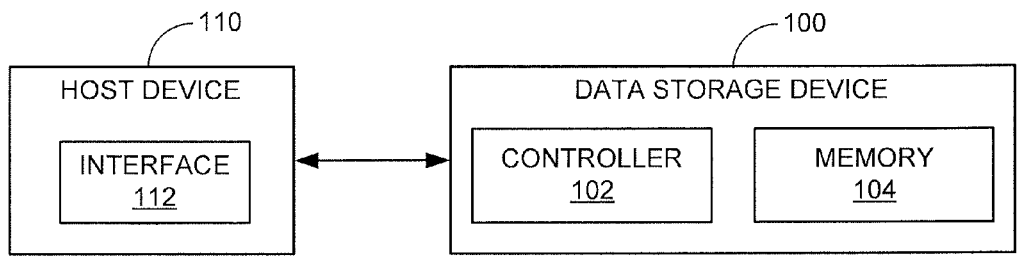
FIG. 1 is a functional block representation of a data storage system which operates in accordance with various embodiments of the present disclosure.

Data security schemes are used to reduce or eliminate unwanted access to data by unauthorized users of digital data storage systems. Data security schemes can employ a variety of security techniques, such as data encryption and the generation of authorization (hash) codes.

Data encryption generally involves the transformation of an input data sequence (plaintext) to an encrypted output data sequence (ciphertext) using a selected encryption algorithm (cipher). The cipher may utilize one or more pieces of auxiliary data (keys) to effect the transformation. In this context, plaintext can include data that have been previously encrypted by an upstream encryption process.

Keyed message digest values can be used to ensure that a given set of data has not been altered by an attacker or process. Keyed message digest values can take a variety of forms, such as but not limited to keyed-hash message authentication codes (HMACs), etc. Generally, a keyed message digest value is a code word that provides indications of tampering with (e.g., changes to) an associated data set. In some cases, a hash can be applied to a set of data (whether plaintext or ciphertext) to generate a keyed-digest value (e.g., an HMAC, etc.), and both the data and the digest value can be stored to a memory. During an authentication operation, the data can be retrieved and used to generate a new digest value that is compared to the original digest value. If the two digest values match, it can be determined that no changes to the data have been made and the data can be safely used.

Some types of memory devices are configured to write each new version of a particular set of data to a different location within a memory, such as in the case of flash memory arrays. Blocks of memory cells that store older versions of the data can be scheduled for erasure using a background garbage collection operation. If such erasures have not yet taken place at the time of a system attack, an attacker may be able to locate multiple versions of the same data and/or components of the security system (e.g., encryption keys, HMAC values, etc.) and use this information to access the stored data or perform other malicious actions.

Various embodiments of the present invention are generally directed to an apparatus and method for securing data stored to a memory of a data storage device. As explained below, some embodiments provide a hidden encryption (cryptographic) key that is maintained in a secure internal location not normally available to an attacker. The hidden key may be provided within a system on chip (SOC) device, such as an application specific integrated circuit (ASIC), using one-time-program (OTP) fuses or other internal non-volatile memory.

A special keystore data structure (also "keystore value") is encrypted by the hidden key and stored in a special non-volatile memory location, such as a serial flash memory of the data storage device. The keystore data structure incorporates various important system parameters, such as encryption keys and counters used to protect other data stored within a main memory of the data storage device. The main memory may be a NAND flash memory, rotatable memory, etc.

The keystore data structure allows the data-level encryption keys and other important system parameters to be stored in a single controlled location, rather than distributing the system parameters across the device in different memory locations. This reduces access to both current and prior versions of the keys by an attacker, making the data less susceptible to roll-back attacks. A backup copy of the keystore data structure may be provided in another location within or outside the device.

When access to the system parameter information is required, the system can forward the keystore data structure to the SOC for a decryption operation, and the decrypted system parameter information from the keystore data structure can thereafter be used as needed by the system. The keystore data structure may be periodically updated, in which case the previous version of the keystore data structure is removed from its memory location, a secure erasure operation is applied to the memory location, and the new keystore data structure is written to that memory location or to a new memory location. In this way, only one version of the keystore data structure is normally available within the system.

Keyed message digest values, such as but not limited to keyed-hash message authentication codes (HMACs), are additionally employed by the system in some embodiments. Such codes generally operate to detect tampering (alteration) of a given data set. For example, an HMAC value can be generated for and stored with the keystore data structure, and used to authenticate the keystore data structure at times when the keystore data structure is accessed. Additional HMAC values (or other types of digest values) can be generated and distributed throughout the system to provide authentication of other data sets.

This provides a hierarchical security scheme organized to handle at least three different types of data within a data storage device: (1) data for which no protection is provided; (2) data for which authentication security is provided through the use of keyed message digest values (e.g., the HMAC values); and (3) data that is protected for confidentiality, such as by being encrypted with one or more keys that are in turn protected via encryption. This latter category includes the keystore data structure itself as well as data sets that have been encrypted by the encryption keys embedded within the keystore data structure.

These and other features of various embodiments can be understood beginning with a review of FIG. 1 which shows a generalized data storage device 100. The data storage device 100 includes a controller 102 and a memory module 104. The controller 102 is a hardware-based or programmable processor that provides top level control of the device 100. The memory module 104 can take a variety of forms including solid-state memory, rotatable media, flash memory, spin-torque transfer random access memory (STRAM), resistive random access memory (RRAM), etc. In some cases, the functionality of the controller 102 is directly incorporated into the memory module 104.

The data storage device 100 is shown in FIG. 1 to be operably connected to a host device 110. The host device 110 can take a variety of forms such as a computer, laptop, tablet, smart phone, gaming console, server, controller or other interactive device. The data storage device 100 provides data storage capabilities for the host device 110, and to this end, data access (e.g., read/write) commands and data transfers may be exchanged between the host device 110 and the data storage device 100.

The host device 110 incorporates various operational elements including a processor and a memory. Of interest is an interface 112. A user of the host device 110, and/or internal processes of the system, may use the interface 112 to communicate with the data storage device 100, such as through the entry of a user password during a boot initialization operation. The interface can take any number of suitable forms and may include user interface aspects such as a display, keyboard, touch screen, mouse, etc. and application programming interface (API) elements.

Figure 2:
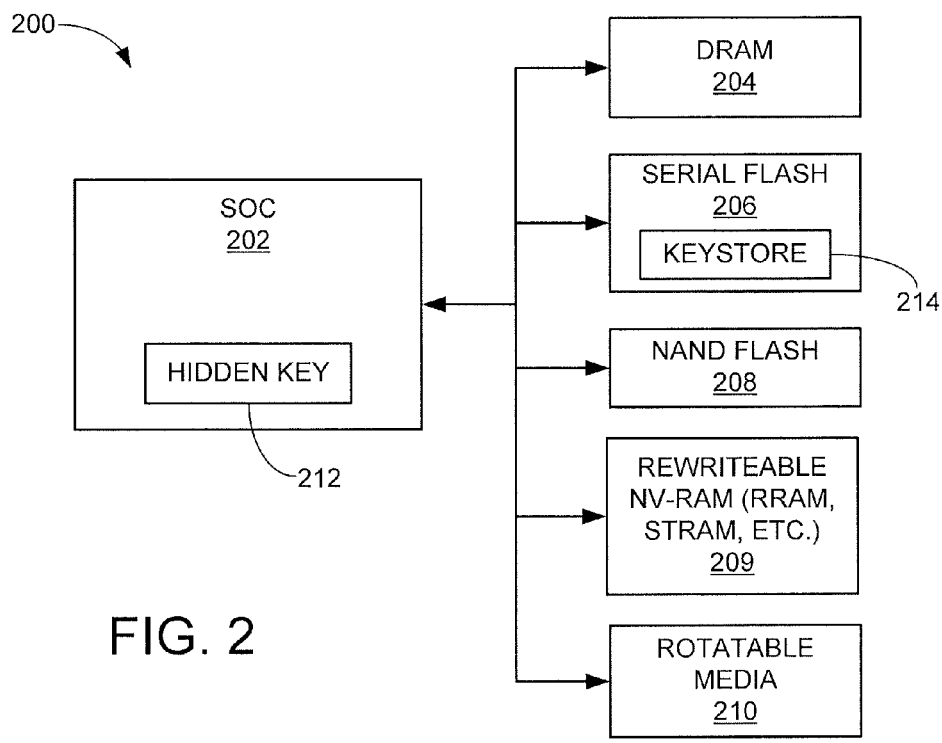
FIG. 2 is a functional block representation of the data storage device of FIG. 1 in accordance with some embodiments.

FIG. 2 is a functional block representation of another data storage device 200 similar to the device 100 in FIG. 1. The data storage device 200 includes a system on chip (SOC) device 202 operably connected to a number of different memory modules, including a volatile dynamic random access memory (DRAM) 204, a non-volatile NOR serial flash memory 206, a non-volatile NAND flash memory 208, a rewriteable non-volatile random access memory (NV-RAM) memory 209 and rotatable media 210. For reference, the various memory modules can be collectively characterized as a single "memory." The NV-RAM memory 209 can take a variety of forms such as rewriteable spin-torque transfer random access memory (STRAM), resistive random access memory (RRAM), etc. The rotatable memory 210 can be optical, magnetic, etc.

The various memory modules are illustrative of different types of memory modules that can be coupled to the SOC 202, and not all of the memory modules shown in FIG. 2 may be present in a given embodiment. For example, a hard disc drive (HDD) embodiment may use rotatable media 210 in the form of optical or magnetic recording media as a main memory store and omit the NAND flash memory 208 and the NV-RAM memory 209. A solid-state drive (SSD) embodiment may omit the rotatable media 210 and use the NAND flash memory 208 and/or the NV-RAM memory 209 as the main memory store. A hybrid embodiment may utilize each of the memories shown in FIG. 2. Other memory modules can be incorporated as well.

The SOC 202 provides controller functionality for the data storage device 200. To this end, the SOC 202 includes an internal memory location 212 to which is stored a hidden cryptographic key. The internal memory location 212 may be formed of one-time programmable (OTP) fusible links, or may take some other form. The hidden key can be any suitable length and can be generated using a variety of methods. It is contemplated that the hidden key may be unique to the SOC 202 and is generally not accessible outside the SOC 202.

As explained below, the hidden key is used to generate a keystore data structure as an encrypted ciphertext string. The encrypted keystore data structure is stored in one or more suitable memory locations in the system. The example shown in FIG. 2 stores the keystore data structure at a selected (address) 214 of the serial flash memory 206. In some cases, the serial flash memory 206 is a 64 KB NOR flash memory with 16 slots (e.g., rows or blocks) of 4 KB each, and the keystore data structure is written to a selected one of the available 4 KB slots. However, other memory locations for the keystore data structure are readily contemplated including one or more of the other non-volatile memory modules (e.g., the NAND flash memory 208 or the rotatable media 210). In other embodiments, the keystore is stored internally within the SOC 202 in a suitable programmable memory location such as a block of rewriteable STRAM memory. A backup copy of the keystore data structure can be stored in the serial flash memory 206 or elsewhere, as discussed below.

Figure 3:
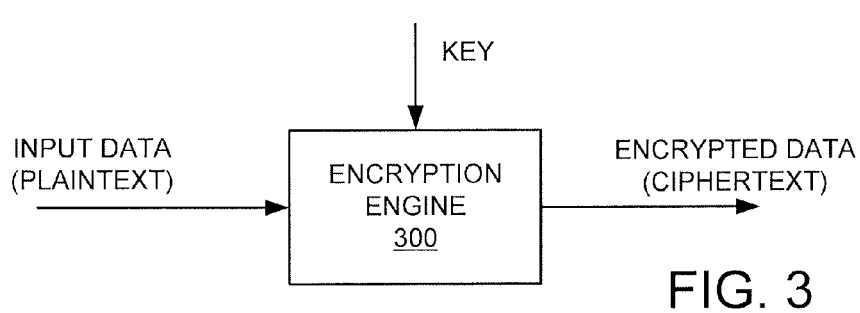
FIG. 3 shows an encryption engine operable in accordance with some embodiments.

FIG. 3 is a simplified block diagram for an encryption engine 300 that can be incorporated into the storage device 200 of FIG. 2. The engine 300 can be formed within the SOC 202 or can be a separate module in communication with the SOC. Generally, the encryption engine 300 operates to receive input data, which may be in the form of plaintext or ciphertext, and to transform the input data using a suitable cipher algorithm to generate encrypted output data (ciphertext).

The cipher algorithm uses one or more key(s) as inputs to control the data transformation. Any number of encryption (cipher) algorithms, such as symmetric encryption algorithms, can be employed as desired in conjunction with a confidentiality mode such as cipher block chaining (CBC), XTS (XOR/encrypt/XOR), counter (CTR), etc. The encryption can involve tweak values, seed values, counter values, initialization vectors, etc. in addition to the key value depicted in FIG. 3.

Figure 4:
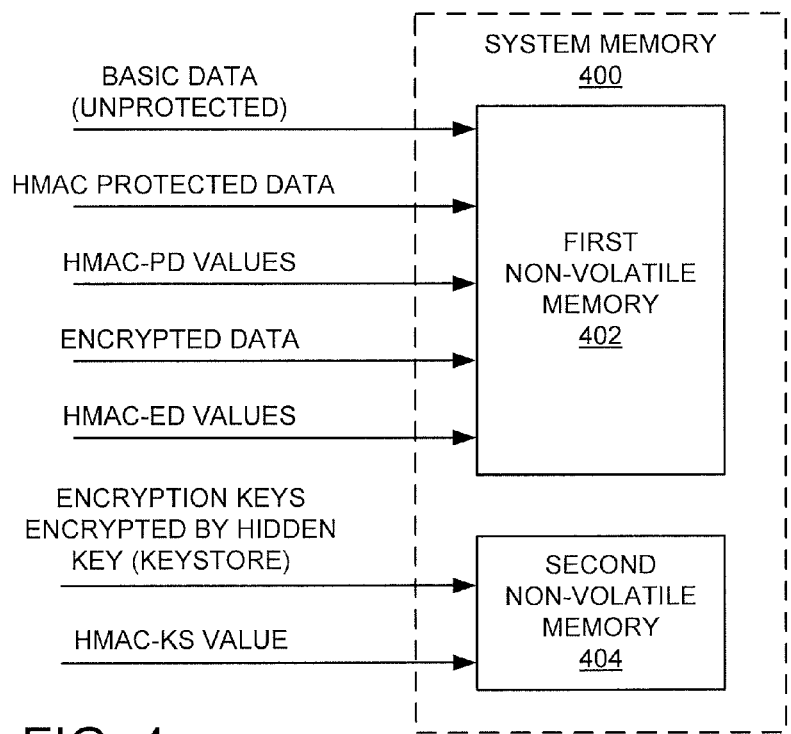
FIG. 4 shows the storage of various types of data in a system memory in accordance with some embodiments.

FIG. 4 shows a system memory module 400 that generally corresponds to the memory module 104 of FIG. 1 in some embodiments. The memory module 400 includes a first non-volatile memory 402 and a second non-volatile memory 404. These modules may be mapped to the NAND flash memory 208 and the serial flash memory 206 of FIG. 2, or may take other forms. Generally, the first memory 402 is a main memory store and the second memory 404 is a secondary memory store. As before, even though the first and second memories 402, 404 have different constructions, these memories can be characterized as a single "memory" or single "non-volatile memory."

A variety of different types of data sets are stored to the respective first and second memories 402, 404. A first listed form of the data sets in FIG. 4 includes basic (unprotected) data, which comprises data to which security protection mechanisms such as encryption or keyed message digest values have not been supplied. The basic data are subjected to normal processing that may include other mechanisms such as error correction codes (ECC), metadata, etc., and may be protected from the standpoint of system-level protections (e.g., device passwords). Nevertheless, no specific security measures are taken to individually protect the basic data. It is contemplated that an unauthorized entity may be able to ascertain the bit sequence of the unprotected data through normal interrogation of the associated memory 400.

A second listed form of the data sets in FIG. 4 is data protected by keyed message digest values (in this example, HMAC values). The HMAC protected data are similar to the unprotected data in that the HMAC protected data are not encrypted using security measures prior to being stored in the first memory 402. The bit sequence of the HMAC protected data might be discovered by an unauthorized entity, as before. However, HMAC values (more generally, keyed message digest values) are generated and stored with the protected data, and the HMAC values can be used to determine whether the protected data have been altered (e.g., to detect "tampering").

The HMAC values for the protected data (referred to as HMAC-PD in FIG. 4) can be generated in a variety of ways. Any suitable cryptographic hash function, such as a message digest algorithm (e.g., MD5) a U.S. National Institute of Standards and Technology (NIST) secure hash algorithm (e.g., SHA-1, SHA-256), etc. may be used to generate the HMAC-PD value depending upon the level of security employed. Multiple layers of hash functions or other operations can be incorporated into the generation of the HMAC-PD value. The HMAC calculation can be carried out within the SOC 202 (FIG. 2).

During a write operation to write a set of protected data to the memory 402, an HMAC-PD value is generated and stored with the protected data. The HMAC-PD can be placed immediately adjacent the protected data, or a pointer can be used to locate the HMAC-PD value in another location within the memory.

During a read operation, a copy of the protected data is retrieved from the memory and subjected to the hash function to generate a new HMAC value. The new HMAC value is compared to the existing HMAC value in memory. If these two values are identical, the copy of the protected data is authenticated and used as required.

The HMAC protected data can comprise higher priority user data as well as important system data, such as a device serial number, system security critical data, etc.

Continuing with FIG. 4, encrypted data sets are also stored to the first memory 402. The encrypted data sets may represent high priority data, such as certain forms of secure user data, system control data, a device password, etc. In some cases, all user data received by the data storage device is encrypted by the device to form encrypted data sets. In other cases, the user (or SOC) designates some user data sets for encryption and other user data sets as unprotected data. HMAC values (HMAC-ED) can be generated and stored for each of the encrypted data sets as shown in case a non-authenticating symmetric encryption confidentiality mode is used.

The encrypted data sets are encrypted using one or more cryptographic (encryption) keys, as discussed above in FIG. 3. The keys are not stored to the main memory 402. Rather, the keys are combined (concatenated), along with other important system parameters as required, into a data structure (e.g., string) that is encrypted to form the keystore data structure discussed above in FIG. 2 using the hidden key within the SOC 202. As shown in FIG. 4, the keystore data structure (or just "keystore") is stored in the second memory 404.

Once the keystore is formed and stored, the encryption keys are discarded and not retained in the memory (e.g., memories 402, 404). The encryption keys can be formed using key derivation functions, random or pseudo-random number generators that provide random or pseudorandom values, etc. The mechanism(s) for forming the encryption keys can be provided within the SOC 202 or in some other circuitry. In some cases, some or all of the keys, or portions used to form the keys, can be supplied by a user of the device. Regardless, it will be appreciated that once the keystore is generated and stored, copies of the keys (in unencrypted form) are not retained in a location susceptible to discovery by an attacking party.

In at least some embodiments, a special HMAC value for the keystore (HMAC-KS) is also generated and stored in the second memory 404. The HMAC-KS value can be generated as discussed above, and can be stored along with the keystore or in another suitable memory location. Generally, the HMAC-KS value can be used to authenticate the keystore (e.g., determine that the keystore has not been subjected to tampering). Although not separately shown in FIG. 4, a backup copy of the keystore may be stored elsewhere in the system.

Figure 5:
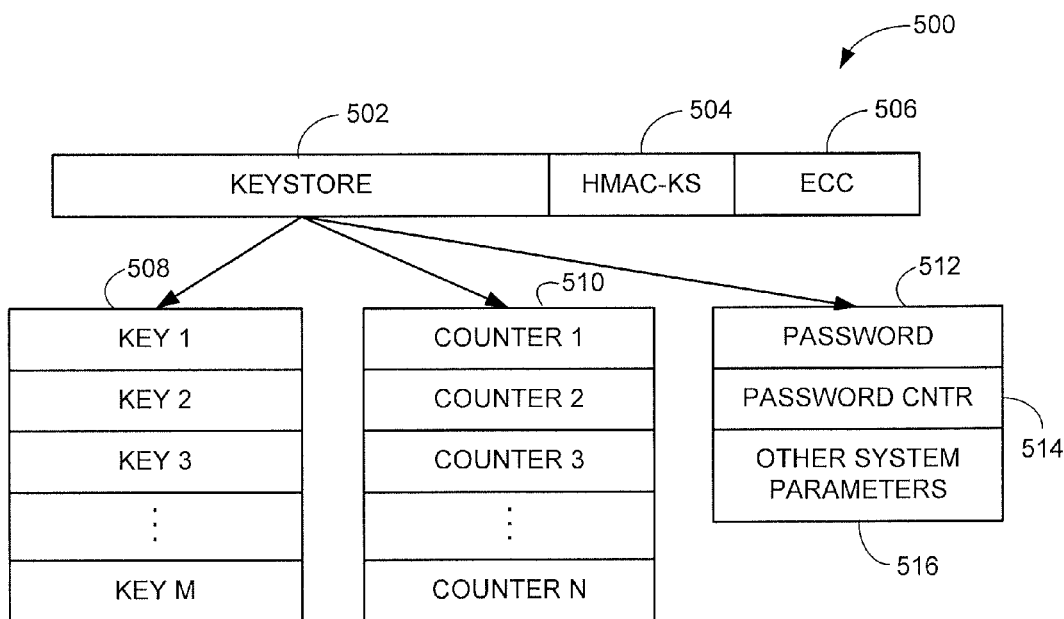
FIG. 5 is an exemplary format for the keystore of FIG. 4 in conjunction with a keystore HMAC (HMAC-KS) and ECC value.

FIG. 5 provides a format for a data structure (string) 500 that is stored in the second memory 404 in FIG. 4 in accordance with some embodiments. The data structure 500 may be a 4 KB structure suitable for storage in a single slot (e.g., block) of the serial flash 208 in FIG. 2. The structure 500 includes a keystore 502, an associated HMAC-KS value 504, and an error correction code (ECC) 506 to detect and correct up to selected number(s) of bit errors in the keystore and HMAC-KS values. As noted above, the keystore contents are concatenated (or otherwise combined) and then encrypted and may include any number of keys 508 (such as Keys 1-M), counter values 510 (such as Counters 1-N), a device password 512, a password "number of tries" counter value 514 and other system parameters 516. As noted above, in other embodiments some of these elements can be stored in the memory as encrypted data or HMAC protected data rather than being incorporated into the keystore.

While not limiting, the first key (Key 1) can be used to encrypt a first encrypted data set in the main memory 402, the second key (Key 2) can be used to encrypt a different, second encrypted data set in the main memory 402, and so on. In other arrangements, the keys in the keystore can be used to encrypt other keys that, in turn, are used to encrypt user data or other values. Similarly, the first counter (Counter 1) can be an internal count associated with a number of system access operations of a first type, and so on. The keys (and counter values) can be internally generated or externally supplied. The secure nature of the keystore 502 allows important system parameters to be stored in a single location under the protection of encryption by the hidden key (FIG. 2).

Figure 6:
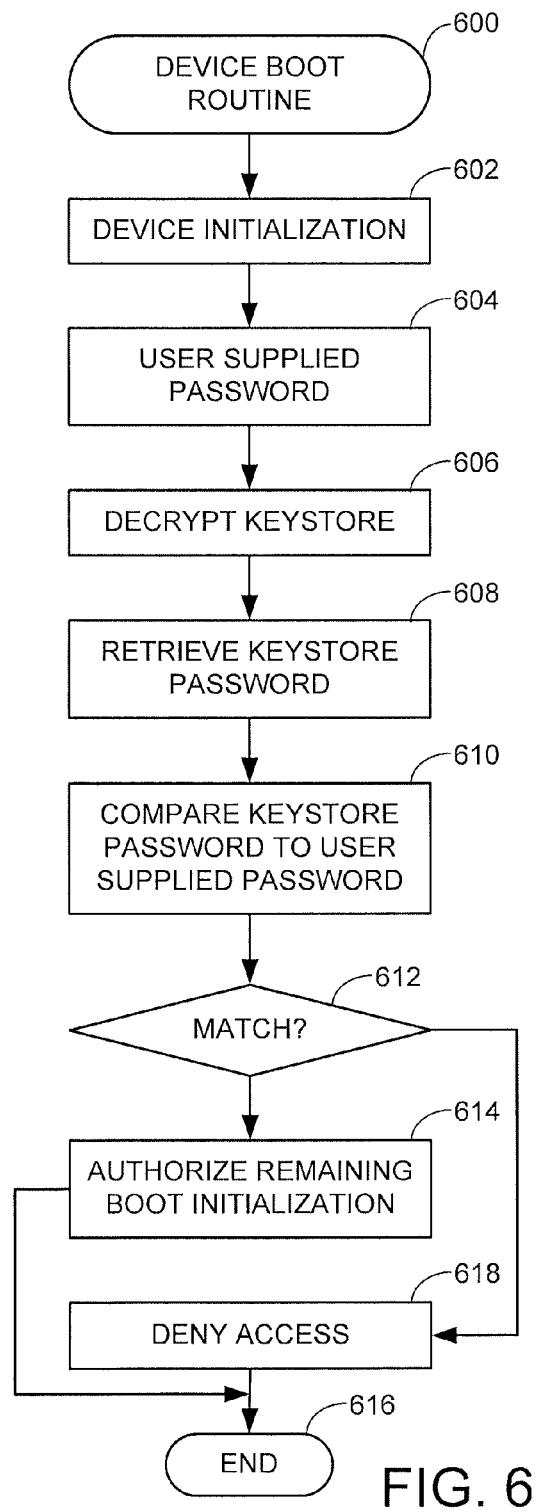
FIG. 6 is a device boot routine carried out in accordance with some embodiments.

FIGS. 6-9 provide a number of flowcharts for routines that describe system operation using the various elements presented above in FIGS. 1-5. Other modes of operation are envisioned. FIG. 6 provides a flowchart for a device boot routine 600 that can be carried out in accordance with some embodiments to securely boot (initialize) a data storage device (e.g., 200 in FIG. 2) protected using a keystore as set forth in FIG. 5. The particulars of a given boot sequence will depend upon the application, so that the routine 600 in FIG. 6 is merely exemplary and not limiting. As with the other flow charts set forth herein, the various steps can be omitted, modified and/or performed in a different order, and other steps can be added as required.

In FIG. 6, the routine commences at step 602 with a device initialization which can include the application of power to transition the associated data storage device from a non-powered or low-powered state to an operational state. During this operation, the user of the device or a larger computer system with which the device is associated is prompted to enter a security password at step 604.

The routine passes to step 606 where the keystore is retrieved from memory and supplied to the SOC 202 for decryption using the hidden key in internal memory 212. This allows the authentic password to be recovered at step 608, and the authentic password is compared to the entered password at step 610.

If the two passwords match (decision step 612), the flow passes to step 614 where remaining aspects of the boot initialization routine are authorized to continue, after which the device enters normal operation and the routine ends at step 616. On the other hand, should the entered password not match the authentic password, access is denied as shown by step 618 and the device does not transition to the normal operational mode. It will be appreciated that any number of additional steps can be taken at this point, such as prompting the user to enter a new password, in which case the routine passes back to step 610 to compare the newly entered password with the authentic password unlocked from the keystore. A counter can be initiated to track the total number of retries in order to set an upper limit (such as 5 retries). If the upper limit is reached, the device can be locked and made no longer responsive to attempts to reboot (or otherwise access) the system.

In some cases, an unauthorized entity can attempt to power down and reinitiate the device boot sequence of FIG. 6 after a number of failed password entries less than the upper limit in order to game the system and obtain additional attempts. The system can be configured such that, after each unsuccessful retry, a total count of unsuccessful retries during the current session is captured by a counter value and incorporated into a new keystore which is then written to non-volatile memory prior to device shutdown. In this way, even if the device is powered off and turned back on, the password attempt history is retained and the rules governing the maximum number of permissible attempts are enforced.

While the routine of FIG. 6 generally involves a boot/initialization type operation, the routine can be readily adapted for other types of access operations, such as accessing password protected user data where, prior to granting access, a user (or process) enters a password or other key value to gain access to the protected data.

Figure 7:
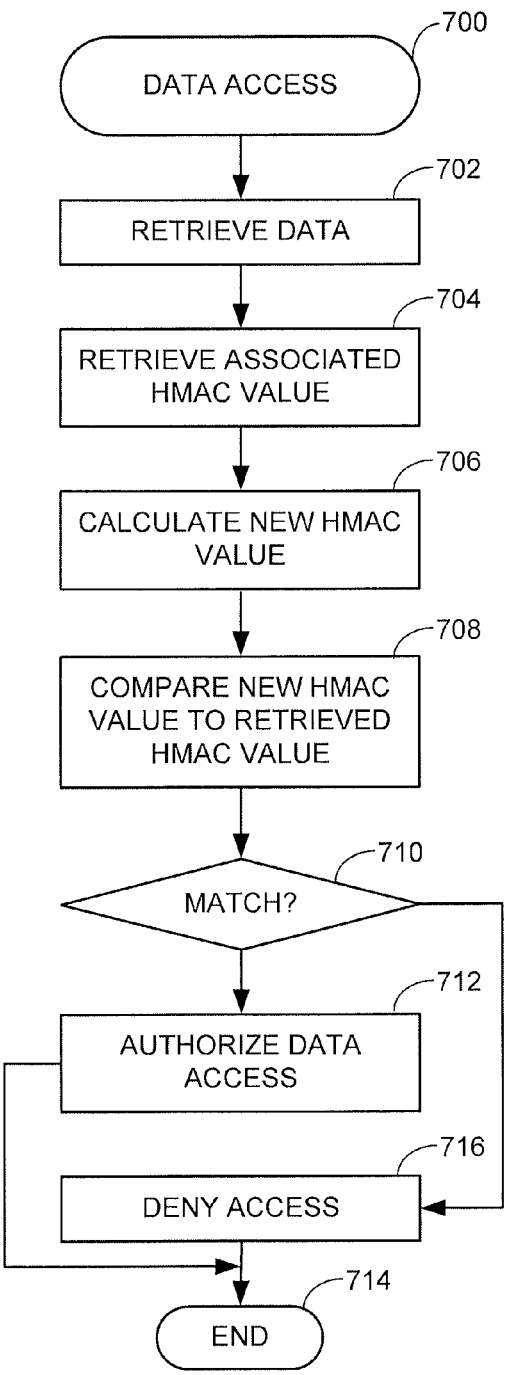
FIG. 7 is a data access routine carried out in accordance with some embodiments.

FIG. 7 shows a flow chart for a data access routine 700 in accordance with some embodiments. Generally, FIG. 7 sets forth steps that can be taken during a data access operation upon data protected by an HMAC value (or more generally, some other form of keyed message digest value), such as the protected data or keystore in FIG. 4.

The HMAC protected data are retrieved at step 702, and the associated HMAC value is retrieved at step 704. A new HMAC value is calculated at step 706 using a key and, optionally, a counter value stored in the keystore, for the data retrieved at step 702, and the new HMAC value is compared to the retrieved HMAC value at step 708.

If the two HMAC values match (decision step 710), the flow passes to step 712 where access to the retrieved data is authorized and the routine ends at step 714. In the case of keystore authentication, the authenticated keystore can proceed to be decrypted by the hidden key and the decrypted contents from the keystore can be used as required. For example, the password can be retrieved from the keystore and used for device access during a boot operation as described in FIG. 6. Alternatively, a selected encryption key (e.g., Key 1 in FIG. 5) can be released for use to decrypt previously encrypted data from the first memory 402 (FIG. 4) once the keystore has been authenticated.

In the case of authenticated protected data, the data can be released for transfer to a requesting host or other process once the HMAC values are found to match. Other alternative operations are contemplated and will readily occur to the skilled artisan in view of the present discussion.

Should the HMAC values not match, the flow passes to step 716 where access to the protected data is denied, either temporarily or permanently. The fact that the HMAC values do not match indicates that some anomalous condition has arisen. In some cases, the data retrieval steps 702 and 704 may be retried and a new HMAC value may be recalculated to account for inadvertent uncorrected errors in the retrieved data. Ultimately, if the mismatch condition persists, then some sort of tampering event may be declared and further access to the data in the current session will be denied. As desired, a record of the mismatch can be generated and stored for future reference or analysis.

FIG. 8 provides a keystore update routine 800 which is operable in some embodiments to provide updates to an existing keystore data structure. The reasons for, and frequency of, updates to the keystore will vary depending on the requirements of a given application. Changes to any of the values set forth in FIG. 5, for example, may result in the generation of a new, updated keystore.

With reference to FIG. 8, once it is determined that a new keystore is to be generated, the existing keystore is retrieved from its existing memory location (e.g., memory location 214, FIG. 2) and loaded to local DRAM (e.g., DRAM 204 in FIG. 2) as shown by steps 802 and 804. A new replacement keystore is generated at step 806. This can include replacing, updating or adding additional data items to the string of important system parameters and then applying encryption using the hidden key within the SOC 202 (FIG. 2).

The newly generated keystore is stored in an appropriate non-volatile memory location at step 808. In some cases, a next available slot (block) of memory in the serial flash 206

(FIG. 2) is selected for the storage of the updated keystore. As desired, one or more backup copies of the keystore can also be stored at this time.

A secure erasure operation is applied to the memory location that stored the previous version of the keystore, as shown at step 810. The secure erasure can include multiple write and erase operations to reduce the ability of an attacking party from discovering the bit sequence of the previous keystore. The previous version of the keystore in DRAM is also deleted at this time, and as desired, a new HMAC value for the new keystore is generated and stored. The routine then ends at step 812.

FIG. 9 is a flowchart for an encrypted data access routine 900 in accordance with some embodiments. The routine 900 is generally directed to accessing data that have been encrypted by encryption keys that are in turn encrypted by the keystore of FIG. 8. As noted above, the encrypted data can include user data or important system data which are intended to be hidden from an attacking party.

The routine commences at step 902 where the encrypted data are retrieved from memory. As desired, an associated HMAC value is also retrieved at step 904, and a new HMAC value is generated at step 906. The two HMAC values are compared at step 908 to authenticate the encrypted data set. If the two HMAC values match (decision step 910), the flow passes to step 912 where the keystore is retrieved from memory and decrypted using the hidden key (FIG. 2) to retrieve the key for the encrypted data (FIG. 5). It will be noted that failure of the HMAC authentication results in a denial of access, step 914, and termination of the routine at step 916. Thus, while the HMAC authentication steps 904 through 910 are helpful in detecting tampering and avoiding an unnecessary decryption operation, these steps can be omitted as desired.

Once the encryption key has been obtained from the keystore, the retrieved key is used to decrypt the encrypted data set, step 918. The decrypted data are thereafter returned to the requesting process at step 920, and the routine ends at 916.

FIG. 10 illustrates portions of another data storage device 1000 similar to the devices discussed above. The data storage device 1000 includes a serial flash memory 1002 that stores a primary copy of a keystore in a first memory location 1004 and a backup copy of the keystore in a second memory location 1006. The primary and backup copies are identical and protect against inadvertent data corruption. The two memory locations 1004, 1006 may be adjacent blocks in the flash memory, or some other respective locations. It will be noted that during keystore updates as discussed in FIG. 8, both copies will be removed from the serial flash memory 1002 and the respective memory locations 1004, 1006 will both be securely erased.

FIG. 11 shows portions of another data storage device 1100 similar to the devices discussed above. The device 1100 has a SOC 1102 similar to the SOC 202 in FIG. 2 and includes a hidden key stored in an internal non-volatile memory 1104, a keystore stored in another internal non-volatile memory 1106, and an encryption engine 1108 operable to carry out various encryption operations including operations to generate the keystore using the hidden key. Because the keystore may be periodically updated, the memory 1106 may be configured to be rewriteable, such as an internal set of STRAM, RRAM, flash, etc.

A feature of the SOC 1102 in FIG. 11 is that both the hidden key and the keystore are not directly accessible outside the boundaries of the SOC, and that the encryption operations are carried out internally.

FIG. 12 provides another data storage device 1200 similar to the devices discussed above. The data storage device 1200 includes various elements including a SOC 1202 with a hidden key stored in an internal non-volatile memory 1204. A primary copy of a keystore is stored in a memory 1206 external to the SOC 1202. A communication network 1208 is used to facilitate communications between the data storage device 1200 and a remote secure server 1210. The secure server 12120 stores a backup copy of the keystore in another memory 1212. Suitable security protocols can be used to allow the data storage device 1200 to access and retrieve the backup copy of the keystore from the secure server 1210 when attempts to decrypt the primary copy of the keystore from the memory 1206 are unsuccessful.

FIG. 13 illustrates portions of another data storage device 1300 similar to those discussed above. The data storage device 1300 includes a keystore generation module 1302 which receives various system parameters such as encryption keys, a password, one or more counts, etc., concatenates these elements into a string, and encrypts the string using the hidden key (e.g., FIG. 2) to form the encrypted keystore data structure. An HMAC generation module 1304 applies a hash function to the encrypted keystore data structure to generate a corresponding keystore HMAC value (HMAC-KS). Both the encrypted keystore data structure and the HMAC-KS value are stored in a non-volatile memory 1306.

In some cases, the keystore generation module 1302 can further operate to encrypt various input data sets using respective encryption keys to provide encrypted data sets which are also stored in the memory 1306, and the HMAC generation module 1304 can be used to generate authorization codes (e.g., HMAC values) for the encrypted data sets.

Once the encrypted keystore data structure is generated, the encryption keys are jettisoned so that the keys (in unencrypted form) are not retained by the device 1300 in a location accessible by an attacker (e.g., the keys are not stored in the memory 1306 apart from being stored in encrypted from within the keystore). The keystore generation module 1302 and the HMAC generation module 1304 can be stand alone modules or incorporated into an SOC such as the SOC 202 of FIG. 2.

The keystore generation module 1302 can further operate to decrypt the keystore to retrieve the contents of the originally generated string during an access operation. For example, the keystore generation module 1302 can retrieve the original device password and compare this password to a password entered by a user during a boot initialization or other access operation, as discussed above in FIG. 6.

While various embodiments of the present disclosure have been directed to the environment of a data storage device, such is merely exemplary and not limiting. Any number of different types of systems, including communication systems, portable electronic systems, medical devices, etc. can incorporate the various features set forth herein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms wherein the appended claims are expressed.

What is claimed is:

1. A computer-implemented method comprising:
receiving, across an interface, first and second data sets of input data from a host into a local memory of a data storage device;
applying first and second encryption keys to the respective first and second sets of input data to form corresponding first and second encrypted data sets in the local memory;
combining the first and second encryption keys to form a string;
using a hidden key stored within a system on chip (SOC) to encrypt the string to form an encrypted keystore data structure in the local memory; and
transferring the first and second encrypted data sets and the encrypted keystore data structure from the local memory to a non-volatile main memory of the data storage device;
subsequently receiving a read request for at least a selected one of the first or second sets of input data from the host;
retrieving the encrypted keystore data structure from the main memory to the local memory;
decrypting the encrypted keystore data structure to recover the first and second encryption keys;
using at least a selected one of the recovered first or second encryption keys to decrypt the at least selected one of the first or second encrypted data sets; and
transferring, across the interface, the at least selected one of the decrypted first or second input data sets to the host.

2. The method of claim 1, further comprising:
retrieving the first encrypted data set and the encrypted keystore data structure from the main memory;
using the hidden key to decrypt the encrypted keystore data structure to retrieve the first encryption key; and
using the first encryption key to decrypt the first encrypted data set to retrieve the first set of input data.

3. The method of claim 1, further comprising generating a keyed message digest value by applying a hash function to the encrypted keystore data structure, and storing the keyed message digest value in the main memory.

4. The method of claim 3, further comprising retrieving the encrypted keystore data structure and the keyed message digest value from the main memory, generating a new keyed message digest value responsive to the retrieved encrypted keystore data structure, comparing the new keyed message digest value to the retrieved keyed message digest value, and decrypting the retrieved encrypted keystore data structure using the hidden key responsive to a match between the new keyed message digest value and the retrieved keyed message digest value.

5. The method of claim 1, further comprising jettisoning the first and second encryption keys from the local memory after the using step so that the unencrypted first and second encryption keys are not retained in the local memory.

6. The method of claim 1, further comprising using a keyed-hash function to generate a keyed message digest value based on the encrypted keystore data structure and a counter value, and storing the keyed message digest value in the main memory to detect tampering with system data stored in the main memory.

7. The method of claim 6, further comprising retrieving the first encrypted data set and the keyed message digest value from the main memory, using a hash function to generate a new keyed message digest value responsive to the retrieved first encrypted data set, comparing the new keyed message digest value to the retrieved keyed message digest value, and decrypting the retrieved first encrypted data set using the encrypted keystore data structure and the hidden key responsive to a match between the new keyed message digest value and the retrieved keyed message digest value.

8. The method of claim 1, further comprising using a keyed-hash function to generate a keyed message digest value based on the encrypted keystore data structure, and storing the keyed message digest value in the main memory to detect tampering with the encrypted keystore data structure.

9. The method of claim 1, wherein the first and second encrypted data sets are stored in a first portion of the main memory having a first type of construction and the encrypted keystore data structure is stored in a different, second portion of the main memory having a different, second type of construction.

10. The method of claim 9, wherein the first portion of the main memory comprises a selected one of a NAND flash memory or a rotatable storage media and the second portion of the main memory comprises a NOR serial flash memory.

11. The method of claim 1, wherein the method further comprises storing a backup copy of the encrypted keystore data structure in a secure server remote from the data storage device and connected thereto via an intervening communication network.

12. A data storage device comprising:
an encryption engine circuit which uses first and second encryption keys stored in a local memory to respectively encrypt first and second sets of input data received from a host to provide corresponding first and second encrypted data sets in the local memory;
a system on chip (SOC) integrated circuit device comprising an internal non-volatile memory which stores a hidden encryption key;
a keystore generation circuit which combines the first and second encryption keys with an initially entered password from a user of the data storage device to form a string, encrypts the string using the hidden encryption key to form an encrypted keystore data structure, and jettisons the first and second encryption keys from the local memory responsive to formation of the encrypted keystore data structure; and
a non-volatile memory which stores the encrypted keystore data structure and the first and second encrypted data sets;
the SOC further configured to, direct a decryption of the encrypted keystore data structure to retrieve the initially entered password and compare the retrieved initially entered password to a subsequently entered password by the user prior to granting access to selected data stored in the main memory.

13. The data storage device of claim 12, wherein the encrypted keystore data structure is stored in a first portion of the main memory having a first type of construction, and the first and second encrypted data sets are stored in a second portion of the main memory having a different, second type of construction.

14. The data storage device of claim 12, wherein the encryption engine forms a portion of the SOC integrated circuit device.

15. The data storage device of claim 12, wherein the keystore generation module forms a portion of the SOC integrated circuit device.

16. The data storage device of claim 12, further comprising an authorization code generation module which uses at least one hash function to generate a first authorization code responsive to the first encrypted data set, a second authorization code responsive to the second encrypted data set, and a third authorization code responsive to the encrypted keystore data structure, wherein the first, second and third authorization codes are stored in the main memory.

17. The data storage device of claim 12, wherein responsive to a data read command to retrieve the first set of input data to a host device, the SOC retrieves a copy of the first encrypted data set and a copy of the encrypted keystore from the main memory, the keystore generation module decrypts the encrypted keystore using the hidden encryption key to retrieve the first encryption key, the encryption engine decrypts the first encrypted data set using the retrieved first encryption key to provide a decrypted first set of input data, and the SOC transfers the decrypted first set of input data to the host device.

18. The data storage device of claim 12, further comprising a counter which accumulates a count responsive to a total number of faded password entry attempts, and wherein the keystore generation circuit concatenates the count to the first and second encryption keys and the password and forms an updated encrypted keystore data structure after each of the faded password entry attempts.

19. A computer-implemented method comprising:
applying first and second encryption keys to respective first and second sets of input data to form corresponding first and second encrypted data sets;
combining the first and second encryption keys to form a string;
using a hidden key stored within a system on chip (SOC) to encrypt the string to form an encrypted keystore data structure;
generating a keyed message digest value by applying a hash function to the encrypted keystore data structure;
storing the first and second encrypted data sets, the encrypted keystore data structure, and the keyed message digest value in a memory;
subsequently retrieving the encrypted keystore data structure and the keyed message digest value from the memory
generating a new keyed message digest value responsive to the retrieved encrypted keystore data structure;
comparing the new keyed message digest value to the retrieved keyed message digest value; and
decrypting the retrieved encrypted keystore data structure using the hidden key responsive to a match between the new keyed message digest value and the retrieved keyed message digest value.

20. The method of claim 19, wherein the decrypting the retrieved encrypted keystore data structure reveals the first and second encryption keys, and the method further comprises using at least a selected one of the first or second encryption keys to decrypt data retrieved from the memory.

* * * * *